United States Patent
Sanchez et al.

(10) Patent No.: US 7,430,417 B2
(45) Date of Patent: Sep. 30, 2008

(54) METHOD OF RESELECTING A CELL BY A MOBILE TERMINAL IN IDLE MODE IN A CELLULAR TELECOMMUNICATION NETWORK

(75) Inventors: Javier Sanchez, Rueil-Malmaison (FR); Jean Pierre Lambert, Antony (FR)

(73) Assignee: NEC Corporation, Tokyo (JP)

( * ) Notice: Subject to any disclaimer, the term of this patent is extended or adjusted under 35 U.S.C. 154(b) by 287 days.

(21) Appl. No.: 10/721,170

(22) Filed: Nov. 26, 2003

(65) Prior Publication Data

US 2004/0136340 A1 Jul. 15, 2004

(30) Foreign Application Priority Data

Nov. 28, 2002 (FR) .................................. 02 14947

(51) Int. Cl.
*H04Q 7/20* (2006.01)
(52) U.S. Cl. ...................... 455/436; 455/423; 455/438; 455/449
(58) Field of Classification Search ................. 455/436, 455/423, 438, 449
See application file for complete search history.

(56) References Cited

U.S. PATENT DOCUMENTS 5,946,612 A * 8/1999 Johansson ................... 455/405
6,546,251 B1 * 4/2003 Dalsgaard et al. ........... 455/437
2004/0058679 A1 * 3/2004 Dillinger et al. ............ 455/439
2004/0095905 A1 * 5/2004 Pecen et al. ................. 370/331

FOREIGN PATENT DOCUMENTS

EP          0 888 026 A2   12/1998
WO     WO-00/27158 A1    5/2000

OTHER PUBLICATIONS

Digital cellular telecommunications system (Phase 2); Radio subsystem link control (GSM 05.08), European Telecommunication Standards, Jan. 1997, ETS 300 578.

* cited by examiner

*Primary Examiner*—Sanh D Phu
(74) *Attorney, Agent, or Firm*—Dickstein Shapiro LLP

(57) ABSTRACT

A method is provided of reselecting a cell by a mobile terminal in idle mode in a cellular telecommunication network in which the network sends to the terminal a list containing information with regard to the UMTS cells to be identified, and in which the mobile terminal periodically performs a series of procedures of identifying the cells and a series of intersystem measurements on the identified cells. Between two successive procedures of identification, the mobile terminal performs a series of procedures of measurement whose duration is fixed so that the total duration for performing a procedure of identification and the subsequent series of procedures of measurement is less than 25 seconds.

12 Claims, 3 Drawing Sheets

METHOD OF RESELECTING A CELL BY A MOBILE TERMINAL IN IDLE MODE IN A CELLULAR TELECOMMUNICATION NETWORK

BACKGROUND OF THE INVENTION

1. Field of the Invention

The invention is in the field of telecommunications, and more specifically, it relates to a method of reselecting a cell by a mobile terminal in idle mode in a cellular telecommunication network in which the network sends to the mobile terminal a list containing information with regard to the cells to be identified, and in which the mobile terminal periodically performs a series of procedures of identifying the cells and a series of intersystem measurements on the identified cells.

The invention also relates to a GSM (Global System for Mobile communication)—UMTS (Universal Mobile Telephone service) dual mode mobile terminal comprising means for periodically performing a series of procedures of identifying UMTS cells and a series of intersystem measurements on the identified cells.

2. Description of the Related Art

In a cellular network, a mobile terminal is connected to a particular cell of the network, which will be referred to as current cell in the description below.

In order to prepare for reselection of a cell, the network sends to the mobile terminal the list of the neighboring cells in which the access technology is the same as the one implemented in the current cell, as well as the cells in which a different access technology is implemented.

When the measurements are performed on a radio access network whose technology is different from that in the serving cell, they are called "intersystem measurements." The technical specifications of 3GPP (Third Generation Partnership Project) define a minimum duration, as well as a maximum duration for performing intersystem measurements on the identified cells, and a duration limit for performing reselection of a cell. However, these specifications do not impose the use of a particular algorithm of measurements to allow a GSM/UMTS dual mode terminal which is in an idle mode to reselect a UMTS cell from a current GSM cell. The idle mode is a mode in which the terminal is not in communication.

Recall that in idle mode, the terminal enters in a state "of sleep" in order to save the available energy in its battery to the maximum. However, the terminal must "wake up" from time to time to search for new cells and reselect one of them if the reception quality is better than the one measured in the current cell.

SUMMARY OF THE INVENTION

The object of the invention is to propose a method of reselecting method which allows for performing measurements within delays predefined by the technical specifications while extending the life of the battery of the mobile terminal and preserving the reliability of the measurements.

To this end, the invention proposes a method of reselecting a cell by a mobile terminal in idle mode in a cellular telecommunication network in which:

the network sends to the mobile terminal a list containing information with regard to UMTS cells to be identified, and the mobile terminal periodically performs a series of procedures of identifying the cells and a series of intersystem measurements on the identified cells.

According to the invention, between two successive procedures of identification, the mobile terminal performs a series of procedures of measurement whose duration is fixed so that the total duration for performing a procedure of identification and the subsequent series of procedures of measurement is less than 25 seconds.

According to the invention, the mobile terminal may perform a confirmation measurement at the end of a maximum duration of five seconds at most following the identification of a new cell.

In a preferred embodiment, the intersystem measurements and the procedures of identifying cells are performed with the same frequency.

In a second embodiment, the intersystem measurements are performed with a frequency that is higher than the one for the procedures of identification.

The method according to the invention may further comprise the following steps of:

comparing the measurements performed for each cell against a predefined selection criterion, and reselecting the UMTS cell according to the result of the comparing step.

In a variant embodiment, the method comprises a step of performing the measurements on sliding time windows so as to obtain a mean value of the measurements.

The invention also relates to a GSM-UMTS dual mode mobile terminal comprising means for periodically performing a series of procedures of identifying UMTS cells and a series of intersystem measurements on the identified cells.

According to the invention, the mobile terminal further comprises:

means for allocating, every 20 seconds, a time window for identifying new UMTS cells among a plurality of UMTS cells indicated to the mobile terminal by the network, the time windows being alternately assigned to the various carrier frequencies used in the cells of the network, means for simultaneously performing, every five seconds, measurements on the UMTS cells already identified belonging to the same carrier frequency.

Preferably, the mobile terminal may comprise means for performing a confirmation measurement on each new cell identified and satisfying a predefined reselection criterion, the confirmation measurement being performed at most five seconds after the identification of that new cell.

According to the present invention, the measurements can be performed within delays predefined by the technical specifications while the life of the battery of the mobile terminal is extended and the reliability of the measurements is preserved.

Other characteristics and advantages of the invention will be apparent from the following description, made by way of non-limiting example with reference to accompanying drawings.

DETAILED DESCRIPTION OF THE PREFERRED EMBODIMENTS

The following description relates to a procedure of reselecting a UMTS cell by a GSM/UMTS dual mode mobile terminal in idle mode in a GSM cell. Recall that in order to prepare for the reselecting of the UMTS cell, the network sends to the mobile terminal a list of GSM cells and a list of neighboring UMTS cells containing at least information with regard to the UMTS cells to be identified such as for example a CDMA code or the carrier frequency used in the neighboring cells of the list. The terminal has to first identify a UMTS cell among all cells of the list that are in its radio environment. To this end, the terminal receives, for example, a unique CDMA code of the UMTS cell to be identified and uses this code to estimate the time base of the cell by a procedure of calculation defined by the technical specifications of 3GPP. The cell will be identified when its time base and its signature are determined by this procedure of calculation.

For each cell thus identified, the mobile terminal performs periodical measurements and applies a selection criterion defined by the technical specifications according to the result of these measurements. When this criterion is satisfied, the terminal can take the decision to switch to the one of the UMTS cells identified and measured.

Figure 1:
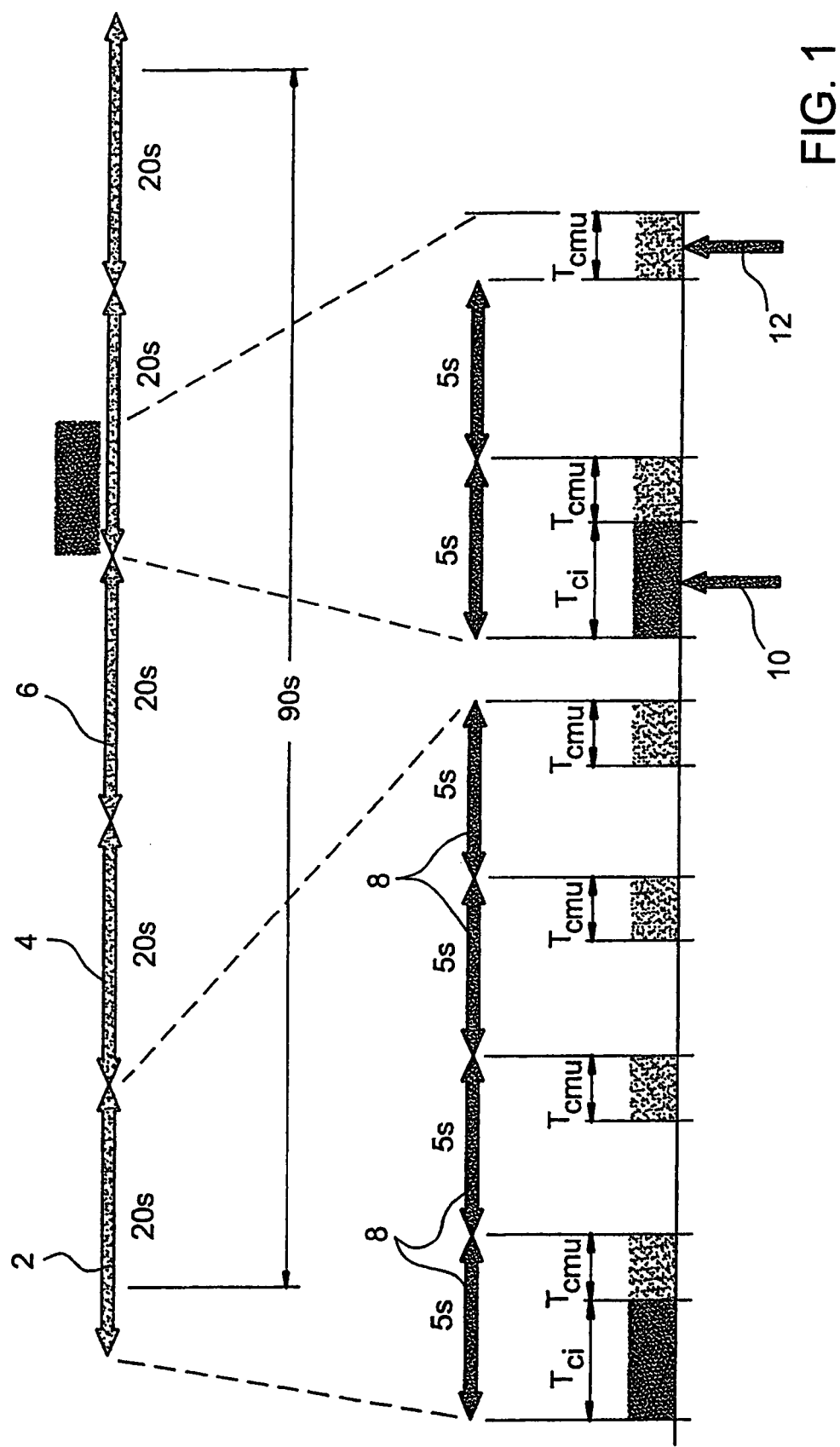
FIG. 1 is a time diagram illustrating a first embodiment of the invention.

FIG. 1 schematically shows a first embodiment of the method in which the terminal periodically performs a series of procedures of identifying cells and a series of intersystem measurements on the identified cells.

This embodiment comprises a first step that consists in allocating every period $T_p=20$ seconds a time window for identifying new UMTS cells, the GMS network supplying CDMA codes associated with them. These successive time windows are allocated alternately to various carrier frequencies in the list given by the network to the mobile terminal. In the case of FIG. 1, three carrier frequencies $f_0$, $f_1$ and $f_2$ are used by the base stations of the network. A first time window 2 is allocated to the identification of the cells in which the network uses the carrier frequency $f_0$, a second time window 4, opening twenty seconds later, is dedicated to the identification of the cells in which the network uses the carrier frequency $f_1$, and a third time window 6, opening twenty seconds later, is allocated to the identification of the cells in the carrier frequency $f_2$.

Each period $T_p$ of twenty seconds is subdivided into four subperiods 8 of five second duration, each comprising a first interval $T_{CI}$ during which the mobile terminal carries out a procedure of identifying a new cell in one of the carrier frequencies $f_0$, $f_1$, or $f_2$, and a second interval $T_{cmu}$ during which the mobile terminal performs measurements in the cells that have already been identified and in which the network uses the carrier frequency $f_0$, $f_1$, and $f_2$.

In a preferred embodiment of the invention, those measurements may be averaged in accordance with the principle of sliding windows filtering.

The new cells that are identified in due course are integrated into the next interval $T_{cmu}$ for measurement.

When a new cell is identified as indicated by arrow 10 and if this cell satisfies the reselection criterion defined in the specifications [3GPP 05.08 Sections 6.6.5], it is measured again, as indicated by arrow 12, five seconds after it becomes better. Prior to this, the terminal performs, in the interval that follows the point indicated by the arrow 10 corresponding to the identification of the new cell, measurements on all the other UMTS cells already identified in order to make sure that none of them has become better in the meantime.

Thus, after the new UMTS cell has been identified and it has been confirmed to have the best quality in comparison with the current GSM cell and the UMTS cells identified in advance, a new window for, measurements is opened. In this window, the UMTS cells identified in due course, as well as the cells identified in advance are measured. Five seconds later, a new window is opened and new measurements on all the identified UMTS cells are performed with the possibility of filtering the measurement taken on the new cell in $f_0$ identified five seconds earlier.

Figure 2:
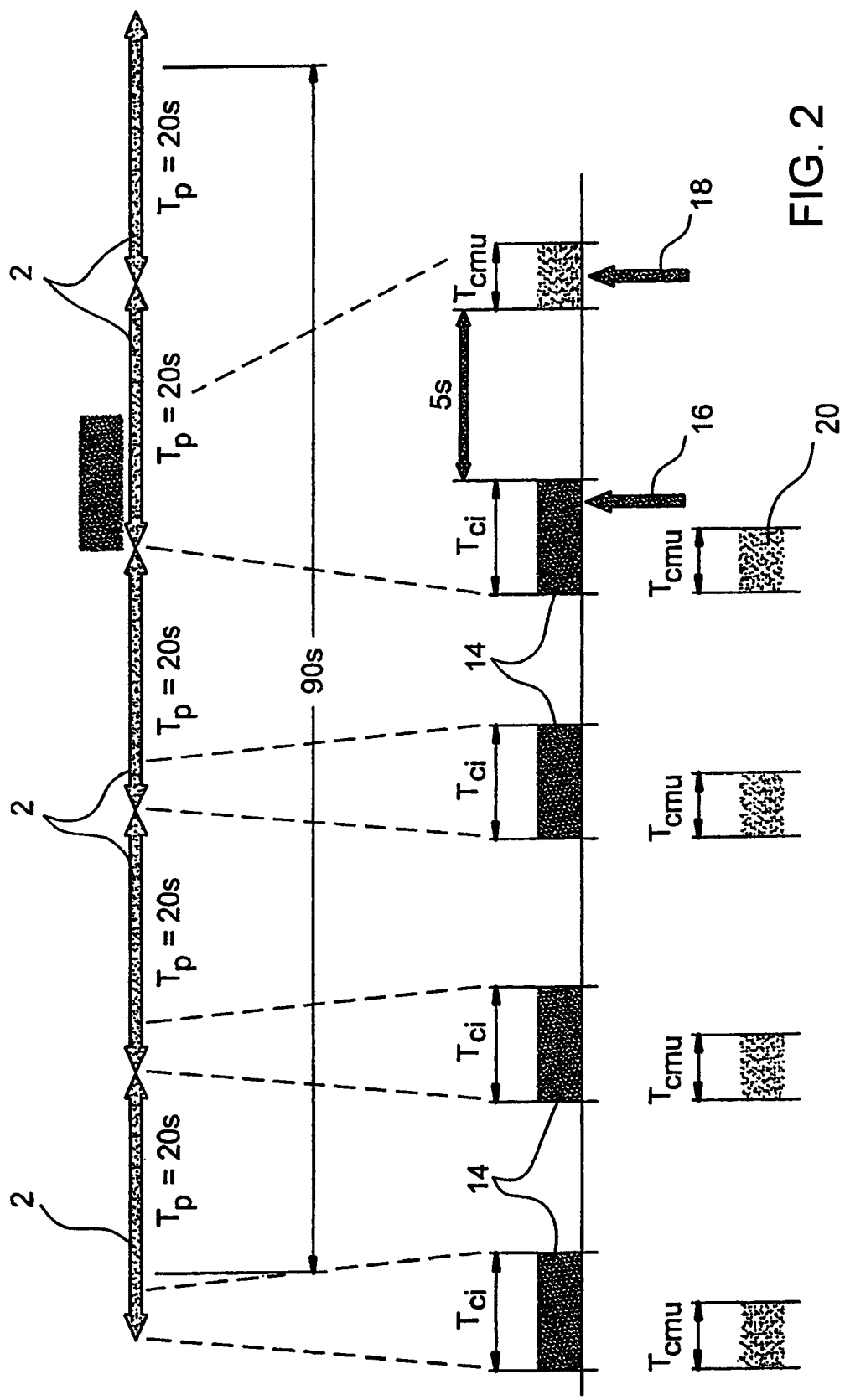
FIG. 2 is a time diagram illustrating a second embodiment of the invention.

FIG. 2 illustrates a second or variant embodiment of the invention in which the periods $T_p$ of twenty seconds are not subdivided into measurement subperiods of equal durations. In this case, the measurements are performed every twenty seconds in time windows 14. An advantage of this variation comes from the fact that the measurements are performed in a more spaced apart fashion and thus the mobile terminal in GSM mode in the idle state is awakened less frequently. This leads to better management of the energy of the battery.

As in the first embodiment, when a new cell is identified as indicated by arrow 16, and if this cell satisfies the reselection criterion defined in the specifications [3GPP 05.08 Sections 6.6.5], it is measured again, as indicated arrow 18, five seconds after it becomes better. In the same way as in the first embodiment, the terminal simultaneously and on the same carrier frequencies performs in the interval 20 measurements on all the other UMTS cells already identified in order to make sure that none of them has become better in the meantime.

In the two embodiments, the method allows for periodical allocation of two types of windows, one for performing measurements and the other for trying to identify new cells. This method further allows for filtering the measurements once every five seconds, and modifying the rhythm of taking measurements from five seconds to twenty seconds.

In the two embodiments, the terminal alternates the phases of identifying new cells once every twenty seconds for each carrier frequency in the list given by the network to the mobile terminal. However, the terminal may perform identification of cells in the various frequencies during the same period of identification $T_p$.

Figure 3:
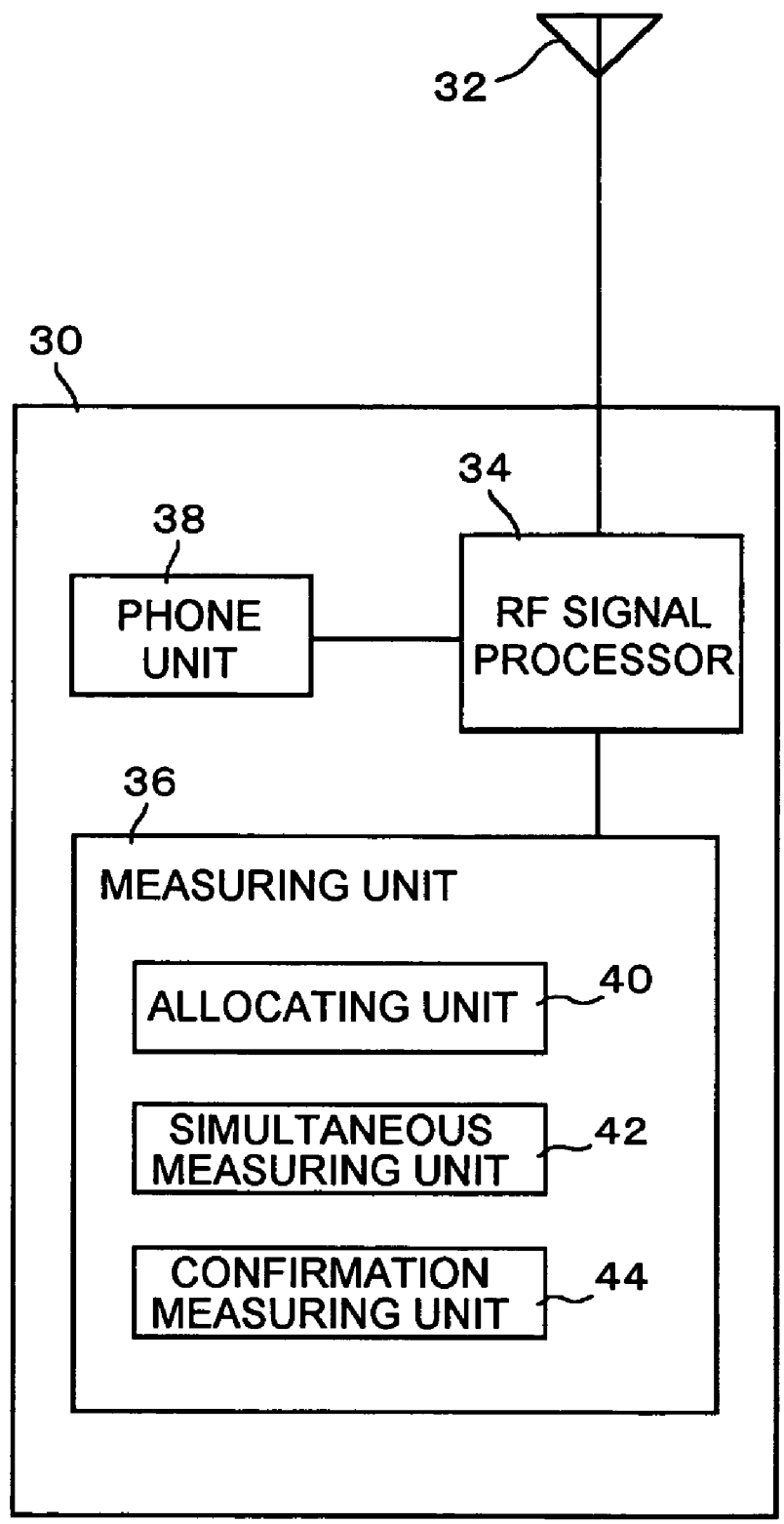
FIG. 3 is a block diagram illustrating an example of a mobile terminal according to the invention.

FIG. 3 shows an example of the mobile terminal according to the invention.

Mobile terminal 30 is a GSM-UMTS dual mode mobile terminal and has antenna 32, RF signal processor 34 connected to antenna 32, measuring unit 36 for periodically performing a series of procedures of identifying UMTS cells and a series of intersystem measurements on the identified cells, and phone unit 38 which realizes general functions of a cellular phone such as dialing and voice communication. Measuring unit 36 and phone unit 38 are connected to RF signal processor 34. Especially, measuring unit 36 has allocating unit 40 for allocating, every 20 seconds, a time window for identifying new UMTS cells among a plurality of UMTS cells indicated to mobile terminal 30 by the network, simultaneous measuring unit 42 for simultaneously performing, every five seconds, measurements on the UMTS cells already identified belonging to the same carrier frequency, and confirmation measurement unit 44 for performing a confirmation measurement on each new cell identified and satisfying a predefined reselection criterion. Allocating unit 40 allocates the time windows so that the time windows being alternately assigned to the various carrier frequencies used in the cells of the network. Confirmation measurement unit 44 performs the confirmation measurement at most five seconds after the identification of that new cell.

While a preferred embodiment of the present invention has been described using specific terms, such description is for illustrative purposes only, and it is to be understood that changes and variations may be made without departing from the spirit or scope of the following claims.

What is claimed is:

1. A method of reselecting a cell by a mobile terminal in idle mode in a cellular telecommunication network in which the network sends to the terminal a list containing information with regard to the UMTS cells to be identified, and the terminal periodically performs a series of procedures of identifying said cells and a series of intersystem measurements on the identified cells, wherein, between two successive procedures of identification, the terminal performs a series of procedures of measurement whose duration is fixed so that total duration for performing a procedure of identification and the subsequent series of procedures of measurement is less than 25 seconds.

2. The method according to claim 1, further comprising the steps of:

comparing the measurements performed for each cell against a predefined selection criterion, and reselecting the UMTS cell according to a result of the comparing step.

3. The method according to claim 2, further comprising the step of performing the measurements on sliding time windows so as to obtain a mean value of said measurements.

4. The method according to claim, 1, wherein the terminal performs a confirmation measurement at the end of a maximum duration of five seconds at most following the identification of a new cell.

5. The method according to claim 4, further comprising the steps of: comparing the measurements performed for each cell against a predefined selection criterion, and reselecting the UMTS cell according to a result of the comparing step.

6. The method according to claim 5, further comprising the step of performing the measurements on sliding time windows so as to obtain a mean value of said measurements.

7. The method according to claim 1, wherein the intersystem measurements are performed with a frequency that is higher than the one for the procedures of identification.

8. The method according to claim 7, further comprising the steps of: comparing the measurements performed for each cell against a predefined selection criterion, and reselecting the UMTS cell according to a result of the comparing step.

9. The method according to claim 8, further comprising a step that consists in performing the measurements on sliding time windows so as to obtain a mean value of said measurements.

10. A method of reselecting a cell by a mobile terminal in idle mode in a cellular telecommunication network in which the network sends to the terminal a list containing information with regard to the UMTS cells to be identified, and the terminal periodically performs a series of procedures of identifying said cells and a series of intersystem measurements on the identified cells, wherein, between two successive procedures of identification, the terminal performs a series of procedures of measurement whose duration is fixed so that total duration for performing a procedure of identification and the subsequent series of procedures of measurement is less than 25 seconds, wherein the intersystem measurements and the procedures of identification of cells are performed with the same frequency.

11. The method according to claim 10, further comprising the steps of: comparing the measurements performed for each cell against a predefined selection criterion, and reselecting the UMTS cell according to a result of the comparing step.

12. The method according to claim 11, further comprising the step of performing the measurements on sliding time windows so as to obtain a mean value of said measurements.

* * * * *